Patented Apr. 27, 1926.

1,582,537

UNITED STATES PATENT OFFICE.

MARTIN J. PRUCHA, OF URBANA, ILLINOIS, AND JOHN MAX WIDMER, OF CEDAR RAPIDS, IOWA, ASSIGNORS TO PENICK & FORD LTD. INCORPORATED, A CORPORATION OF DELAWARE.

PURIFICATION OF STARCH.

No Drawing. Application filed December 10, 1920. Serial No. 429,760.

*To all whom it may concern:*

Be it known that we, MARTIN J. PRUCHA and JOHN M. WIDMER, citizens of the United States, residing at Urbana, in the county of Champaign and State of Illinois, and Cedar Rapids, in the county of Linn and State of Iowa, respectively, have invented certain new and useful Improvements in the Purification of Starch, of which the following is a specification.

Our invention relates to the manufacture of starch from Indian corn, and is concerned in particular with the elimination from the starch of such protein impurities as may be contained therein after the tabling of the starch or other operation employed for separating the bulk of the so-called gluten from the starch.

In the manufacture of starch from corn it is customary, after steeping the grain, comminuting it and separating therefrom successively the germ and the hull and fiber constituent, to flow the resultant starch and protein magma over tables to separate the protein or "gluten" from the starch. This operation can be so performed as to remove most of the gluten from the starch, but under the best of conditions there will always remain in the starch a small quantity of protein, frequently about five-tenths of one per cent, calculated on the starch in dry condition. This impurity, which is negligible when the starch is used for laundry, or culinary purposes, causes a great deal of trouble if the starch be converted into glucose or corn sugar. When ordinary commercial starch is converted, for example, by the usual method of heating in the presence of an acid, the converted liquor is found to be discolored because of the reaction between the acid and protein matter in the starch and requires filtration through bone black which is an expensive operation. Moreover, in the case of glucose especially the effect of the bone char filtering is not always permanent. On standing the product is likely to lose its whiteness. The characteristic bitter taste of corn sugar is the result of the presence in the starch of the same impurity. If the end product is a solid sugar the presence of the residual protein prevents complete conversion of the starch, and complete crystallization of the sugar, besides involving a sacrifice of a part of the dextrose in the form of mother liquor or "hydrol" which is pressed out, and is of less commercial value.

The object of our invention is to provide a novel and improved method of eliminating the residual protein in starch, more especially corn starch, by introducing into the starch proteolytic enzymes, that is, enzymes of a character to render the protein matter soluble. With the protein in a soluble state its removal from the starch is an easy matter. Preferably we employ pepsin for the purpose of rendering the protein soluble although other known proteolytic enzymes, such as trypsin or the enzymes of proteolytic bacteria might be used though, we believe, with less advantage.

In practicing the process of our invention in the manner which we deem preferable, the starch, for example starch as it comes from the starch tables, is mixed with water, and the liquor so formed acidified with hydrochloric or other acid. Pepsin is then added and the mixture is agitated to put the starch all in suspension in the water and to thoroughly diffuse the enzymes. The liquid is allowed to stand until the protein substances are dissolved and the starch settles. Separation of the starch from the water and dissolved protein may then be made in any desired manner, for example, by decantation of the liquid standing above the starch, and washing of the starch.

Pepsin is active only in an acid medium. When the starch treated is taken from the starch tables it will contain ordinarily a small amount of acid but for effective results the acidity should be increased to substantially one degree Fuller (.036% computed on the water). Hydrochloric or other acid may be added to the starch to give it substantially this acidity. In practice we use commercial pepsin of 1 to 3000 strength (one pound of pepsin making soluble three thousand pounds of egg albumen). For starch containing a protein content of one-half of one per cent one gram of such pepsin should be used for each hundred pounds of dry starch. The agitation is continued until all of the starch is in suspension and the liquor should be kept at a temperature of approximately 105° Fahrenheit. Under average conditions, if the starch liquor be allowed to stand for twelve hours the protein will be completely dissolved. By this time the starch will have settled to the bottom of the vat. The next step is to remove the water standing above the starch, and as this water will contain a certain amount of acid and some of the pepsin it may be advantageously used for treating the next batch. After decantation of the water the starch is preferably washed to remove the soluble protein which it contains.

If the starch to be treated contains bacterial life to any considerable extent, which may be the case, for example, if it has remained for some time on the tables, or, if ordinary commercial starch be used, the enzymic action is made more effective by subjecting the starch to a treatment which destroys or inhibits action of such organisms as live on pepsin or inhibit its activity. This sterilization may be accomplished, when pepsin is the enzymic agent employed in the purifying step, by pretreatment of the starch liquor with a suitable amount of sulphur dioxide ($SO_2$). The amount used will depend upon the condition of the starch. Under ordinary conditions the sulphur dioxide need not be more than .08% measured on the water content.

One advantage of the method above described in comparison with the method of inoculating the starch with bacteria which multiply and produce enzymes of a proteolytic character in the starch is that the period of time required for the purification of the starch of its residual protein is very much shortened. This is desirable in itself and makes possible another advantage, namely, that with the period of fermentation shortened there is much less danger of contamination of the material by micro-organisms of types calculated to inhibit or check the contemplated proteolytic action. With the bacterial process (meaning the process involving inoculation of the starch with cultures of proteolytic bacteria) care must be taken that the starch be relatively sterile at the start and that throughout the prolonged treatment foreign micro-organisms be excluded.

Another advantage of our process is that by using pepsin as an enzymic agent the starch to be treated, if contaminated, may be given the pretreatment with sulphur dioxide, as described. This pretreatment not only destroys any contaminating bacteria which the starch may contain but prevents the activity of any such bacteria as may reach the material during the proteolyzing step. The presence of the sulphur dioxide as sulphurous acid in the small quantities which are used does not substantially affect the action of the pepsin on the protein. Where the purification results from enzymes produced by bacteria in the starch itself there can be, of course, no treatment of the starch to destroy or inhibit foreign bacteria, which would have a like destructive or inhibitive effect upon the proteolytic bacteria. In a process in which the proteolysis is not dependent upon bacterial life in the material it is possible to prevent fermentive contaminations by keeping the starch in sterile condition throughout the period of enzymic action.

It will be understood that in describing the process as above, we have sought to give a typical manner in which our invention may be practiced without limiting the scope of invention as defined by the claims. The invention is not to be considered as limited to the particular details specified. The condition of the starch, for example, as to protein content and presence of bacterial life, will not always be uniform. The process will, therefore, require, in order that the best results be obtained, some judgment in its application to a particular batch. With the directions for practicing the process as above set forth such variations as may be necessary will be within the capacity of those skilled in this art.

By the term "commercial starch" as used in the claims we intend starch from which the bulk of the protein has been removed by tabling or other means but which contains, as all starches of commerce do at the present time, the small amount of protein impurity, or "residual protein" as we termed it, to which reference has been made throughout the specification.

We claim:

1. A method for removing residual protein impurities from starch which has been separated from its vegetable source, and from which the bulk of the protein has been removed, which consists in introducing into the starch, enzymes capable of making soluble substantially all of the protein matter therein, and dissolving and removing the protein matter rendered soluble by the enzymic action.

2. A method for removing residual protein impurities from starch which has been separated from its vegetable source, and from which the bulk of the protein has been removed which consists in introducing into the starch in suspension in water enzymes capable of making soluble substantially all of the protein matter therein, and then separating the dissolved protein from the starch.

3. A method for removing residual protein impurities from starch which has been separated from its vegetable source, and from which the bulk of the protein has been removed, which consists in introducing into the starch in suspension in water enzymes capable of rendering soluble substantially all of the protein matter, allowing the material to stand until the protein has been dissolved and the starch settles, decanting the water and washing the starch.

4. A method for removing residual protein impurities from starch which has been separated from its vegetable source, and from which the bulk of the protein has been removed, which consists in mixing starch with water, acidifying the starch liquor, treating the same with pepsin to dissolve substantially all the protein therein and separating the dissolved protein from the starch.

5. A method for removing residual protein impurities from starch which has been separated from its vegetable source, and from which the bulk of the protein has been removed, which consists in mixing starch with water, acidifying the starch liquor, introducing pepsin into the starch liquor to dissolve substantially all the residual protein therein and allowing the liquor to stand until the starch settles out, and decanting the water and washing the starch.

6. A method for removing residual protein impurities from starch which has been separated from its vegetable source, and from which the bulk of the protein has been removed, which consists in sterilizing the starch, subjecting the same to the action of enzymes capable of making substantially all of the protein soluble, and dissolving and removing the protein matter thus made soluble.

7. A method for removing residual protein impurities from starch which has been separated from its vegetable source, and from which the bulk of the protein has been removed, which consists in treating the starch with sulphur dioxide to destroy or inhibit bacterial life, introducing into the starch mixed with water enzymes capable of making soluble substantially all of the protein, and dissolving and removing the protein matter thus rendered soluble.

8. A method for removing residual protein impurities from starch which has been separated from its vegetable source, and from which the bulk of the protein has been removed, which consists in treating the starch with sulphur dioxide to destroy or inhibit bacterial life, then treating the same with pepsin to make soluble substantially all of the protein, and dissolving and removing the protein matter thus made soluble.

9. A method for removing residual protein impurities from starch which has been separated from its vegetable source, and from which the bulk of the protein has been removed, which consists in mixing the starch with water, acidifying the starch liquor, introducing pepsin into the starch liquor and agitating the liquor, allowing the liquor to stand at a temperature of approximately 105° Fahrenheit until the protein is substantially completely dissolved and until the starch settles out, decanting the water above the starch, and washing the starch.

10. Method of purifying commercial starch from which the bulk of the protein matter has been removed, which consists in mixing the starch with water, acidifying the starch liquor, introducing pepsin into the liquor, bringing the starch into suspension and mixing it with the pepsin by agitation, then allowing the liquor to stand until the protein impurity is dissolved, and finally separating the starch from the water carrying in solution the dissolved impurity.

11. A method for removing residual protein from separated starch containing only a small percentage of the impurity, which comprises mixing with the starch pepsin and dilute hydrochloric acid, agitating the mixture while maintaining it at a temperature of approximately 40° C. until the protein is dissolved and separating the starch from the solution.

12. A method of obtaining pure starch from corn, consisting in steeping and comminuting the corn and removing the fiber constituents, tabling the remaining material to remove the bulk of the protein matter, suspending the starch in water, and introducing enzymes to dissolve the residual protein matter.

13. A method of obtaining pure starch from corn, consisting in steeping and comminuting the corn and removing the fiber constituents, tabling the remaining material to remove the bulk of the protein matter, suspending the starch in water, acidifying the starch liquor, introducing pepsin to dissolve the residual protein, and separating the starch from the solution.

MARTIN J. PRUCHA.
JOHN MAX WIDMER.